Dec. 9, 1969 W. H. E. WIDL 3,483,510

ERROR DETECTING AND CONTROL DEVICE IN A DATA TRANSMISSION SYSTEM

Filed Feb. 4, 1966 2 Sheets-Sheet 1

INVENTOR
Walter Herbert Erwin Widl
BY Hane and Nydick
ATTORNEYS

INVENTOR.
WALTER HERBERT ERWIN WIDL
BY Hane and Nydick
ATTORNEYS

United States Patent Office 3,483,510
Patented Dec. 9, 1969

3,483,510

ERROR DETECTING AND CONTROL DEVICE IN A DATA TRANSMISSION SYSTEM

Walter Herbert Erwin Widl, Bandhagen, Sweden, assignor to Telefonaktiebolaget L M Ericsson, Stockholm, Sweden, a corporation of Sweden Filed Feb. 4, 1966, Ser. No. 525,241
Claims priority, application Sweden, Mar. 26, 1965, 3,932/65
Int. Cl. G06f *11/04*
U.S. Cl. 340—146.1 2 Claims

ABSTRACT OF THE DISCLOSURE

A data transmission system includes a data sender connected via a transmission channel. Synchronization is established by clock pulses fed to a data receiver from the sender to the receiver. The data sender can operate in a forward or reverse direction. The data receiver can sense for erroneous data and signal for a "rewind" and retransmission. In the receiver there are clock pulse counting means which, in effect, measure time intervals associated with the signalling for retransmissions. The clock pulse counts are monitored to determine whether the proper time intervals have elapsed and if not to indicate an error.

TRANSMISSION SYSTEM

The present invention refers to data transmission between a sender with a bidirectional feeding device and a receiver with means for recording symbols as well as a device for reading control, for example the detection of errors according to the parity principle. During the data transmission it is premised that clock pulses from the sender side synchronize the forward feeding and recording by the receiver and the forward reverse feeding (rewind) of the sender. In addition, a backward signal is emitted from the receiver to the sender at the end of a clock pulse occurring at the same time as a faulty data symbol is detected, and the recording in the receiver is then suspended. The backward signal from the receiver then switches the sender from reverse feeding to backward feeding when it is received in the sender and an emission of a symbol then taking place has been ended. The feeding then switches from reverse to forward feeding, when the backward signal ceases and a clock pulse in progress has been ended. These switchings are accompanied by a forward signal from the sender to the receiver, this forward signal having the purpose of reengaging the devices for registration of data symbols in the receiver. This implies that an erroneously transmitted data symbol has been repeated.

During such a transmission of data symbols it is required partly that the beginning and the end of the backward signal have the same transmission time, and partly that they occur within a particular part of the clock pulse. The backward signal must not switch the sender from forward feeding to reverse feeding during the emission of a data symbol and it must not switch from reverse feeding to forward feeding during the part of a clock pulse used for the emission of a symbol since there is then a great risk that errors will occur. The switchings between reverse feeding and backward feeding should take place at fixed times within a clock pulse, for example at the beginning or at the end of the pulse and within a short interval of time. If the backward signal occurs in the sender within this interval, the automatic correction is uncertain. Even if the transmission time and the termination time of the backward signal are adjusted with particular means in such a way that the beginning and the end of the signal occur in the middle of the permitted part of a clock pulse, disturbances and changes may occur. This causes the transmission time of the beginning of the backward signal and the transmission time of the end of the backward signal to differ from each other by more than half a clock pulse period. Consequently a data symbol will be lost or be recorded twice in the receiver during the retransmission of a data symbol erroneously transmitted.

Also for the forward signal disturbances may occur. The invention has an object to control the retransmission and to mark a faulty retransmission of the kind mentioned above.

Briefly, the invention accomplishes this control by means of a counting device at the receiver for counting the clock pulses entering the receiver during the emission of a backward signal, and for counting the clock pulses, entering the receiver during the forward signal following on said backward signal. Means in the counting device signal when the number of the first mentioned clock pulses and the number of the last mentioned clock pulses do not correspond, at least with respect to a parity count.

The invention will be more fully described below with reference to the accompanying drawings wherein.

Figure 2:
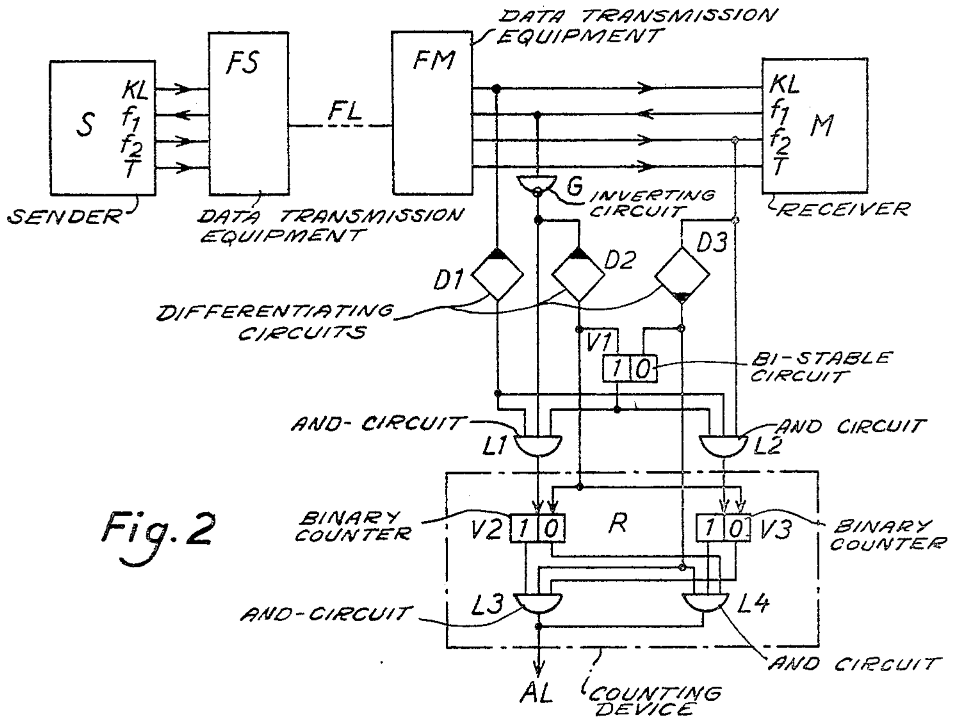
FIG. 2 shows a counting device in accordance with the invention and the connection of the counting device to the receiver.

In FIG. 2, S is a data sender and M is a data receiver connected by a transmission channel FL. At the sender side the channel has a data transmission terminal FS and at the receiver side it has a data transmission terminal FM. From the sender S clock pulses KL, bits or signs or data symbols T, and forward signals *f2* are emitted. From the receiver M backward signals *f1* are emitted.

Figure 1:
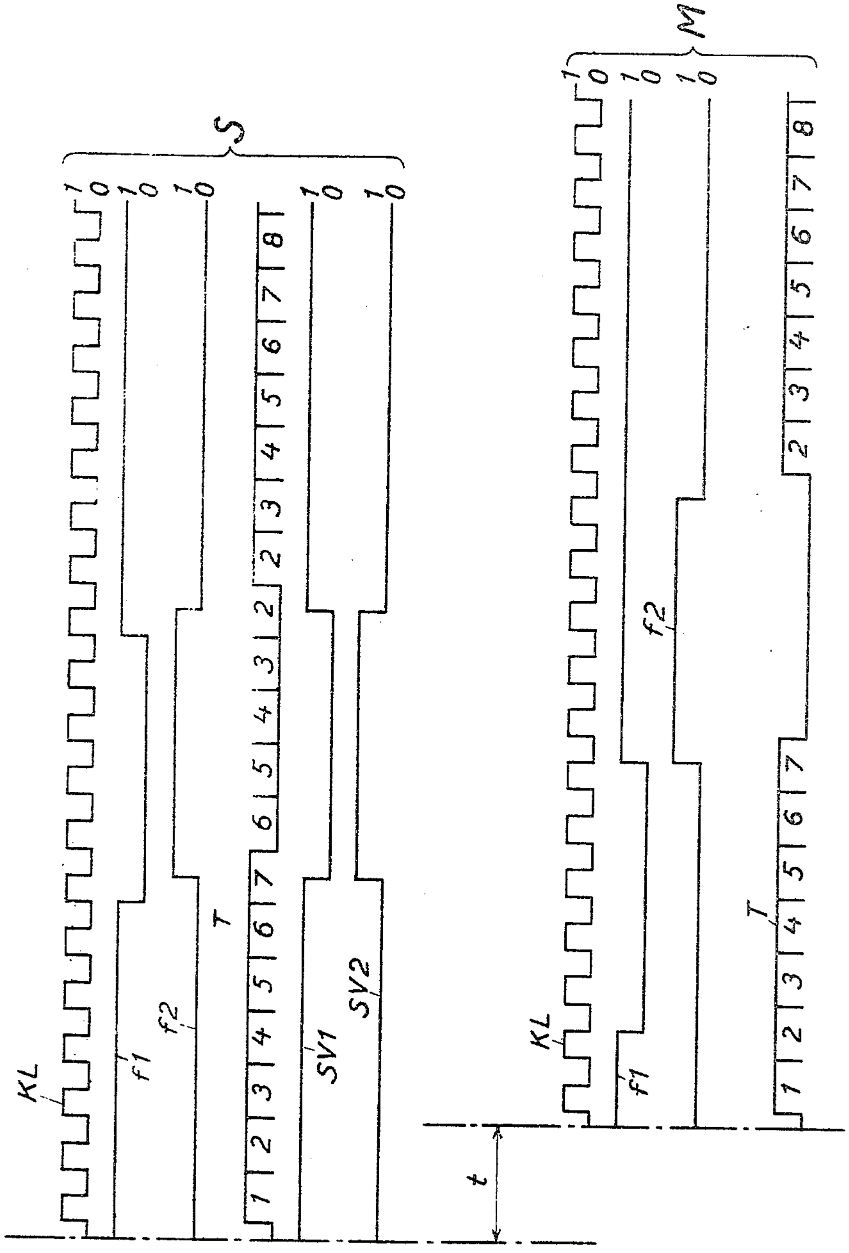
FIG. 1 shows waveforms of signals during the transmission of data symbols, when a faulty symbol occurs.

The four kinds of signals are found on FIG. 1 partly for the sender S and partly for the receiver M. Between sender S and terminal FS and between receiver M and terminal FM, respectively, the signals occur in the form of direct voltages, the presence or absence of which are marked 1 and 0, respectively. Between terminals FS and FM the signals occur in the form of, for example, alternating voltages in frequency multiplex. For the forward and the backward signals *f2* and *f1*, for example, a binary code is used, while for the data transmission a signal code with sufficient redundancy for the detection of errors is used, for example 2 of 6, 4 of 8, or other similar code. The signs T are emitted synchronously with the clock pulses and each of the signs take up a clock pulse period. The transmission time between terminals FS and FM is presumed to be a time *t*. In FIG. 1 the transmission of 8 signs, numbered 1–8, is shown as an example. In the sender S there is a reverse feeding of the signs 6–2, during which time there is no transmission.

At the sender side S two direct current circuits, represented by waveform SV1 and SV2, are shown in FIG. 1. The circuit SV1 is operated, or 1-set, when the forward feeding device of the sender is working, that is when symbols are transmitted. The circuit SV2 is 1-set, when the reverse or rewind feeding device of the sender is working. The forward signal *f2* follows the switching between forward feeding and reverse feeding, which switching only occurs immediately after a clock pulse, that is in the middle of each sign.

FIG. 1 shows the following sequence of events. Clock pulses KL are emitted from sender S to receiver M and a response signal current *f1* is sent from receiver M to sender S, that is $f_1=1$. The emission of signs starts by the emission of the data symbols 1, 2, 3 and so on from sender S to receiver M. The monitor of errors at the receiver senses that there is an error in the data symbol 2, and so the recording of symbols is inhibited therein and a backup or reverse control signal, that is $f_1=0$, is emitted from receiver M to sender S, when the clock pulse for the data symbol 2 ends. The reverse control signal is sensed in sender S at the end of the clock pulse containing the data symbol 6. The sender S is constructed in such a way that a switching from SV1 to SV2 can only take place immediately after a clock pulse, and so the data symbol 7 is emitted before the switching from forward feeding to reverse or rewind feeding takes place. A rewind indicating signal, that is $f_2=1$, is emitted from sender S to receiver M. At the same time the emission of signs is inhibited. The rewind indicating signal is received in the receiver M at the same time as the data symbol 7 terminates. The receiver M terminates the reverse control signal, and so $f_1=1$, which is sensed in the sender S after the time *t*, if the transmission time of this signal is as long as the transmission time of clock pulses and response signals. The end of the reverse control signal will occur at the beginning of a clock pulse, which clock pulse is not reliable for the emission of signs, and so the switching from SV2 to SV1 does not take place until at the end of the clock pulse. After this the emission of signs starts again the data symbol 2.

At a switching from reverse feeding to forward feeding in the sender S, the rewind indicating signal is finished, $f_2$ goes to 0, and the end of the signal coincides with the end of the clock pulse, emitted as the last clock pulse during the rewind feeding in the receiver as well as in the sender. If the repeat transmission has been made correctly, the number of clock pulses in the receiver M during the reverse control signal, that is during the period when $f_1=0$, should be the same as the number of clock pulses during the rewind indicating signal, that is during the period when $f_2=1$.

To control this the receiver M is combined with a counting device R in accordance with FIG. 2. The counting device is connected to the signal wires of the receiver by two and-circuits L1 and L2 and is operated by a bistable circuit V1 and three differentiating circuits D1–D3. Since the backward signals from receiver M, in accordance with the example of embodiment, consists of breaks in a circuit, there is an inverting circuit G.

The errors that are presumed to arise and that are to be detected, mainly consists of a data symbol being repeated twice or lost on account of differences of the transmission time for level changes for $f_1$ and $f_2$ occurring from disturbances. This implies that the number of clock pulses in the receiver during a backward signal is one unit larger or smaller than the number of clock pulses during a forward signal. Thus the counting device R need only sense that both of said numbers have the same parity after a retransmission request.

The counting device R on FIG. 2 consists of two binary counters V2 and V3 and two and-circuits L3 and L4.

The differentiating circuit D1 emits a short current pulse at the beginning of each clock pulse KL. The differentiating circuit D2 emits a short current pulse at the beginning of each reverse control signal $f_1$ and the differentiating circuit D3 emits a short current pulse at the end of each forward signal $f_2$.

When a backward signal is emitted from receiver M to sender S the bi-stable circuit V1 is switched from 0-position to 1-position. The binary counters V2 and V3 are set to the 0-position. As long as the backward signal is present a current pulse is emitted through the and-circuit L1 to the binary counter V2 at the end of each clock pulse, counter. At the first current pulse V2 is readjusted from 0-position to 1-position. At the second current pulse it is readjusted from 1-position to 0-position and so on, and counter V2 remains in 1-position, if the number of current pulses or clock pulses is uneven, and in 0-position, if the number of current pulses is even.

When a forward signal comes to the receiver M, the backward signal is ended and the inverting circuit G closes the and-circuit L1. The forward signal opens and the and-circuit L2 and a current pulse is emitted at the end of each clock pulse to the binary counter V3, that changes from 0-position and 1-position and remains in 1-position, if the number of current pulses is uneven, and in 0-position, if the number of current pulses is even.

When the forward signal is ended, a current pulse is emitted from the differentiating circuit D3 to the switch circuit V1, and to the and-circuits L3 and L4. The circuit V1 is readjusted from 1-position to 0-position. If the binary counters V2 and V3 are both in 0-position or if they are both in 1-position neither of the and-circuits L3 or L4 is open and no signal is obtained through the wire AL. If the binary counters V2 and V3 are in different positions one of the and-circuits L3 or L4 is open and current pulses from the differentiating circuit D3 pass through the marking wire AL to a device for registering errors, the construction of which is nonessential for this invention.

The invention may of course take many forms depending on its intended purpose and requested precision.

A current pulse through the marking circuit AL is premised to stop the data transmission or to mark the place in a series of registered data symbols where an error has been marked.

Figure 3:
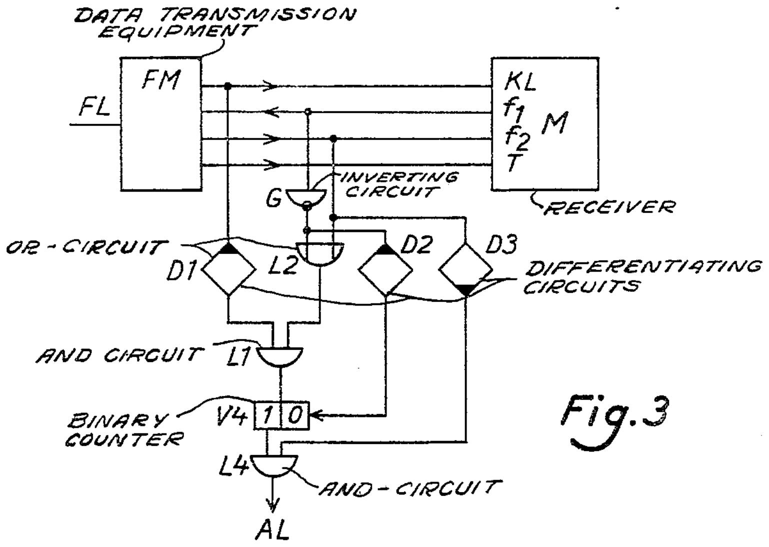
FIG. 3 shows another embodiment of the counting device.

In FIG. 3 a second embodiment of the counter is shown. At the beginning of each clock pulse the derivating circuit $D_1$ emits a pulse to the and-circuit L1. If a backward signal, $f_1=0$, through the inverting circuit G, or a forward signal $f_2=1$, is marked in the receiver, there is a voltage from the or-circuit L2 to the and-circuit L1 and the pulses from differentiator D1 pass from circuit L1 to the binary counter V4. At the beginning of each forward signal a pulse is emitted through the differentiating circuit D2 for 0-setting of the binary counter V4, after which this binary counter changes positions for each clock pulse. If the number of clock pulses during the backward signal is the same as the number of clock pulses during the forward signal at a repeating, counter V4 is in 0-position after the repeating. If said number differs by one unit, V4 is in 1-position. At the end of the forward signal a pulse from the differentiating circuit D3 is obtained, and if counter V4 is in 1-position, a current pulse is obtained through the and-circuit L4 to the marking wire AL.

I claim:

1. A data transmission system comprising:

a data sender, a data receiver, and a transmission channel connecting said data sender to said data receiver, said data sender including a source of clock pulses for transmission to said data receiver, a source of data symbols controllable to operate in a forward and a reverse direction, and a controllable source of a first control signal which is transmitted to said data receiver when said source of data symbols operates in the forward direction;

said data receiver including means for recording data symbols received from said data sender, means for detecting errors in received data symbols, means responsive to said detecting means for preventing the recording of data symbols and for generating a second control signal for transmission to said data sender to control said source of data symbols to operate in the reverse direction and to cause said controllable source to stop transmitting said first control signal to said data receiver; and means sensing for the termination of said first control signal in said data receiver to control said recording means to again record data symbols and to terminate the transmission of said second control signal to said data sender, and means for counting the number of clock pulses received by said data receiver during the interval said second control signal is generated in said data receiver and for counting the number of clock pulses received by said data receiver during the time interval said first control signal is received by said data receiver, and means for sensing for a given relationship between the two counts of clock pulses.

2. The system of claim 1 wherein the given relationship sensed by said sensing means is a parity relationship.

References Cited

UNITED STATES PATENTS 2,735,889 2/1956 Canfora ________ 340—146.1 X 2,970,189 1/1961 Van Dalen et al. __ 340—146.1 X
3,317,667 5/1967 Da Silva ________ 340—146.1 X

FOREIGN PATENTS 983,613 2/1965 Great Britain.

MALCOLM A. MORRISON, Primary Examiner

C. E. ATKINSON, Assistant Examiner